(12) United States Patent
McMullen

(10) Patent No.: US 12,046,982 B2
(45) Date of Patent: *Jul. 23, 2024

(54) MAGNETIC SUPPORTING OF THRUST LOAD FOR DOWNHOLE-TYPE ARTIFICIAL LIFT SYSTEM

(71) Applicant: Upwing Energy, Inc., Cerritos, CA (US)

(72) Inventor: Patrick McMullen, Cerritos, CA (US)

(73) Assignee: Upwing Energy, Inc., Cerritos, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 17/475,981

(22) Filed: Sep. 15, 2021

(65) Prior Publication Data

US 2022/0006352 A1 Jan. 6, 2022

Related U.S. Application Data

(62) Division of application No. 15/857,533, filed on Dec. 28, 2017, now abandoned.

(Continued)

(51) Int. Cl.
*H02K 7/09* (2006.01)
*E21B 4/00* (2006.01)
(Continued)

(52) U.S. Cl.
CPC ............... *H02K 7/09* (2013.01); *E21B 4/003* (2013.01); *E21B 4/02* (2013.01); *E21B 4/04* (2013.01);
(Continued)

(58) Field of Classification Search
CPC ........ E21B 17/028; E21B 33/12; E21B 4/003; E21B 4/02; E21B 4/04; E21B 41/0085; E21B 43/121; E21B 43/128; E21B 43/129; E21B 43/168; E21B 47/008; E21B 47/01; E21B 47/06; E21B 47/07; E21B 47/09; E21B 47/12; F04B 17/03; F04B 47/04;
(Continued)

(56) References Cited

U.S. PATENT DOCUMENTS 4,413,958 A 11/1983 Webb
5,126,610 A 6/1992 Fremerey
(Continued)

FOREIGN PATENT DOCUMENTS

EP 0875685 11/1998
GB 2501352 10/2013

*Primary Examiner* — Vinh P Nguyen
(74) *Attorney, Agent, or Firm* — Fish & Richardson P.C.

(57) ABSTRACT

During rotation of a shaft of a downhole-type wellbore system, a first signal corresponding to an axial position of the rotating shaft is transmitted by a sensor. The shaft is axially levitated by a plurality of magnetic thrust bearings. A controller determines an amount of axial force to apply to the rotating shaft to maintain axial levitation of the rotating shaft based on the first signal. The controller transmits a second signal corresponding to the determined amount of axial force to the plurality of magnetic thrust bearings. The plurality of magnetic thrust bearings applies the amount of axial force on the rotating shaft to maintain the axial levitation of the rotating shaft based on the second signal.

9 Claims, 5 Drawing Sheets

Related U.S. Application Data

(60) Provisional application No. 62/561,067, filed on Sep. 20, 2017.

(51) Int. Cl.
| | |
|---|---|
| *E21B 4/02* | (2006.01) |
| *E21B 4/04* | (2006.01) |
| *E21B 17/02* | (2006.01) |
| *E21B 41/00* | (2006.01) |
| *E21B 43/12* | (2006.01) |
| *E21B 47/008* | (2012.01) |
| *E21B 47/01* | (2012.01) |
| *E21B 47/06* | (2012.01) |
| *E21B 47/09* | (2012.01) |
| *E21B 47/12* | (2012.01) |
| *F04B 17/03* | (2006.01) |
| *F04B 47/04* | (2006.01) |
| *F04D 13/02* | (2006.01) |
| *F04D 13/06* | (2006.01) |
| *F04D 13/08* | (2006.01) |
| *F04D 13/10* | (2006.01) |
| *F04D 25/06* | (2006.01) |
| *F04D 29/041* | (2006.01) |
| *F04D 29/048* | (2006.01) |
| *F04D 29/051* | (2006.01) |
| *F16C 32/04* | (2006.01) |
| *F16C 37/00* | (2006.01) |
| *H02H 7/00* | (2006.01) |
| *H02K 1/2796* | (2022.01) |
| *H02K 3/42* | (2006.01) |
| *H02K 5/132* | (2006.01) |
| *H02K 7/14* | (2006.01) |
| *H02K 7/18* | (2006.01) |
| *H02K 11/21* | (2016.01) |
| *H02K 11/225* | (2016.01) |
| *H02K 11/27* | (2016.01) |
| *H02K 11/30* | (2016.01) |
| *H02K 21/14* | (2006.01) |
| *H02P 29/40* | (2016.01) |
| *E21B 33/12* | (2006.01) |
| *E21B 43/16* | (2006.01) |
| *E21B 47/07* | (2012.01) |
| *F16F 15/03* | (2006.01) |
| *H02K 1/2793* | (2022.01) |
| *H02K 5/128* | (2006.01) |
| *H02K 15/03* | (2006.01) |

(52) U.S. Cl.
CPC ........ *E21B 17/028* (2013.01); *E21B 41/0085* (2013.01); *E21B 43/121* (2013.01); *E21B 47/008* (2020.05); *E21B 47/01* (2013.01); *E21B 47/06* (2013.01); *E21B 47/09* (2013.01); *E21B 47/12* (2013.01); *F04B 17/03* (2013.01); *F04B 47/04* (2013.01); *F04D 13/026* (2013.01); *F04D 13/0633* (2013.01); *F04D 13/064* (2013.01); *F04D 13/08* (2013.01); *F04D 13/086* (2013.01); *F04D 13/10* (2013.01); *F04D 25/0666* (2013.01); *F04D 29/041* (2013.01); *F04D 29/048* (2013.01); *F04D 29/051* (2013.01); *F16C 32/0474* (2013.01); *F16C 32/0476* (2013.01); *F16C 37/005* (2013.01); *H02H 7/005* (2013.01); *H02K 1/2796* (2022.01); *H02K 3/42* (2013.01); *H02K 5/132* (2013.01); *H02K 7/14* (2013.01); *H02K 7/1807* (2013.01); *H02K 11/21* (2016.01); *H02K 11/225* (2016.01); *H02K 11/27* (2016.01); *H02K 11/30* (2016.01); *H02K 21/14* (2013.01); *H02P 29/40* (2016.02); *E21B 33/12* (2013.01); *E21B 43/128* (2013.01); *E21B 43/168* (2013.01); *E21B 47/07* (2020.05); *F16C 32/044* (2013.01); *F16C 2380/26* (2013.01); *F16F 15/03* (2013.01); *H02K 1/2793* (2013.01); *H02K 5/128* (2013.01); *H02K 15/03* (2013.01); *H02K 2205/03* (2013.01)

(58) Field of Classification Search
CPC .. F04D 13/026; F04D 13/0633; F04D 13/064; F04D 13/08; F04D 13/086; F04D 13/10; F04D 25/0666; F04D 29/041; F04D 29/046; F04D 29/0473; F04D 29/048; F04D 29/051; F04D 3/00; F16C 2352/00; F16C 2360/44; F16C 2380/26; F16C 32/0402; F16C 32/0406; F16C 32/044; F16C 32/0444; F16C 32/0446; F16C 32/0451; F16C 32/0455; F16C 32/0457; F16C 32/0474; F16C 32/0476; F16C 32/048; F16C 32/0489; F16C 37/005; F16F 15/03; G01B 7/14; H02K 1/2793; H02K 1/2796; H02K 11/20; H02K 11/21; H02K 11/225; H02K 11/27; H02K 11/30; H02K 15/03; H02K 21/14; H02K 2201/12; H02K 2205/03; H02K 3/42; H02K 5/128; H02K 5/132; H02K 7/09; H02K 7/14; H02K 7/1807; H02H 7/005; H02P 29/40

See application file for complete search history.

(56) References Cited

U.S. PATENT DOCUMENTS

| | | | |
|---|---|---|---|
| 5,248,239 A | 9/1993 | Andrews | |
| 5,514,924 A * | 5/1996 | McMullen | F16C 32/0485 |
| | | | 310/90.5 |
| 5,731,645 A | 3/1998 | Clifton et al. | |
| 5,923,111 A | 7/1999 | Eno et al. | |
| 5,969,451 A | 10/1999 | Lyons et al. | |
| 6,167,965 B1 | 1/2001 | Bearden et al. | |
| 6,504,279 B1 | 1/2003 | Oelsch et al. | |
| 6,837,621 B1 * | 1/2005 | Sakamoto | F04D 29/047 |
| | | | 384/97 |
| 7,971,650 B2 | 7/2011 | Yuratich et al. | |
| 8,487,493 B2 * | 7/2013 | Cunningham | F04D 13/0626 |
| | | | 318/599 |
| 10,145,224 B1 * | 12/2018 | Shenoy | F16C 32/0406 |
| 10,174,762 B1 * | 1/2019 | Chen | F04D 13/064 |
| 10,309,200 B2 * | 6/2019 | McMullen | H02K 11/30 |
| 10,447,111 B2 * | 10/2019 | McMullen | E21B 4/04 |
| 2003/0132003 A1 | 7/2003 | Arauz et al. | |
| 2009/0118567 A1 | 5/2009 | Siess et al. | |
| 2012/0017634 A1 | 1/2012 | Dorman et al. | |
| 2012/0321438 A1 | 12/2012 | Vannini et al. | |
| 2014/0111047 A1 | 4/2014 | Hashish et al. | |
| 2014/0377106 A1 | 12/2014 | Kozaki et al. | |
| 2015/0050170 A1 | 2/2015 | Kozaki | |
| 2015/0114632 A1 | 4/2015 | Romer et al. | |
| 2015/0156620 A1 | 6/2015 | Morita | |
| 2015/0326094 A1 | 11/2015 | Cunningham et al. | |
| 2015/0316097 A1 | 12/2015 | Park et al. | |
| 2016/0118919 A1 | 4/2016 | Malone et al. | |
| 2016/0341012 A1 | 11/2016 | Riley et al. | |
| 2017/0045055 A1 | 2/2017 | Hoefel et al. | |
| 2017/0102030 A1 | 4/2017 | Schroeder et al. | |
| 2017/0138159 A1 | 5/2017 | Hoyte et al. | |
| 2019/0063494 A1 | 2/2019 | Kozaki et al. | |
| 2019/0089221 A1 | 3/2019 | McMullen | |

\* cited by examiner

MAGNETIC SUPPORTING OF THRUST LOAD FOR DOWNHOLE-TYPE ARTIFICIAL LIFT SYSTEM

CROSS-REFERENCE TO RELATED APPLICATIONS

This application is a divisional of and claims the benefit of priority to U.S. patent application Ser. No. 15/857,533, filed Dec. 28, 2017, now abandoned, which claims the benefit under 35 U.S.C. § 119(e) of U.S. Patent Application No. 62/561,067, entitled "Sealless Downhole System with Magnetically Supported Rotor," filed Sep. 20, 2017, which is incorporated herein by reference in its entirety.

TECHNICAL FIELD

This application relates to downhole-type artificial lift systems.

BACKGROUND

Most wells behave characteristically different over time due to geophysical, physical, and chemical changes in the subterranean reservoir that feeds the well. For example, it is common for well production to decline. This decline in production can be due to declining pressures in the reservoir, and can eventually reach a point where there is not enough pressure in the reservoir to economically realize production through the well to the surface. In some instances, a top side pump or compressor is used to extend the life of the well by decreasing pressure at the top of the well. In some instances, a downhole-type artificial lift system, such as an electric submersible pump or compressor, is used to extend the life of the well by increasing pressure within the well.

SUMMARY

This disclosure describes technologies relating to downhole-type systems with a magnetically supported rotor.

An example implementation of the subject matter described within this disclosure is a downhole-type system with the following features. The downhole-type system includes a shaft; a sensor that can sense an axial position of the shaft and generate a first signal corresponding to the axial position of the shaft; a controller coupled to the sensor, in which the controller can receive the first signal generated by the sensor, determine an amount of axial force to apply to the shaft to maintain a target axial position of the shaft, and transmit a second signal corresponding to the determined amount of axial force; and multiple magnetic thrust bearings coupled to the shaft and the controller, in which each magnetic thrust bearing can receive the second signal from the controller and modify a load, corresponding to the second signal, on the shaft to maintain the target axial position of the shaft.

Aspects of the example implementation, which can be combined with the example implementation alone or in combination, include the following.

The magnetic thrust bearings can be sealed from a downhole environment.

The magnetic thrust bearings can be lubricant-free.

Critical components of the magnetic thrust bearings can be sealed from a downhole environment.

The load can be transmitted on the shaft using a coupling.

The magnetic thrust bearings can be located in an isolated environment, and at least a portion of the load can be transmitted using a magnetic coupling.

The magnetic thrust bearings can be coupled to the controller in parallel, in series, or a combination of both.

The controller can multiplex more than one signal, and the second signal can include multiple signals.

The controller can be located topside.

The controller can be located at least 500 meters away from the magnetic thrust bearings.

The sensor can be located in a downhole location, and electronics of the sensor can be located topside.

Each magnetic thrust bearing can include an actuator surrounding the shaft and a target surrounding the shaft, in which the actuator can generate a magnetic field in response to receiving an electric current, and the target can generate an axial force in response to the generated magnetic field.

The actuator can include multiple arcuate portions defining respective openings that complement each other to define an annulus that is larger than an outer diameter of the rotatable shaft.

The arcuate portions can include a first, semi-circular arcuate portion and a second, semi-circular arcuate portion.

The magnetic thrust bearings can include respective actuators coupled by an electrical winding, which can pass an electric signal in response to which the actuators can generate respective magnetic fields.

Each magnetic thrust bearing can include an actuator, and each actuator can be coupled to its respective magnetic thrust bearing by an electrical winding, which can pass an electric signal, in response to which each actuator generates a respective magnetic field. The electrical windings are connected together.

Each actuator can include a fuse that can electrically fail in response to an increase in the electric signal through a portion of the winding wound around each actuator.

The fuse can be reset from a remote location.

Another example implementation of the subject matter described within this disclosure is a method that includes—during rotation of a shaft of a downhole-type wellbore system, in which the shaft is axially levitated by multiple magnetic thrust bearings—transmitting, by a sensor, a first signal corresponding to an axial position of the rotating shaft; determining, by a controller, an amount of axial force to apply to the rotating shaft to maintain axial levitation of the rotating shaft based on the first signal; transmitting, by the controller, a second signal that corresponds to the determined amount of axial force to the magnetic thrust bearings; and applying, by the magnetic thrust bearings, the amount of axial force on the rotating shaft to maintain the axial levitation of the rotating shaft based on the second signal.

Aspects of the example implementation, which can be combined with the example implementation alone or in combination, include the following.

The magnetic thrust bearings can be sealed from a downhole environment.

The magnetic thrust bearings can be lubricant-free.

The magnetic thrust bearings can be coupled to the controller in parallel, in series, or a combination of both.

The method can include generating, by an actuator of one of the magnetic thrust bearings, a magnetic field in response to receiving an electric current and generating, by a target of one of the magnetic thrust bearings, an axial force in response to the generated magnetic field.

The actuator can include arcuate portions defining respective openings that complement each other to define an annulus that is larger than an outer diameter of the rotatable shaft.

The arcuate portions can include a first, semi-circular arcuate portion and a second, semi-circular arcuate portion.

The magnetic thrust bearings can include respective actuators coupled by an electric winding, which can pass an electric signal in response to which the actuators generate respective magnetic fields.

The method can include, by a fuse of one of the actuators, electrically failing in response to an increase in the electric signal through a portion of the winding wound around each actuator.

Another example implementation of the subject matter described within this disclosure is a downhole-type system that includes a shaft; a sensor that can transmit a first signal that corresponds to an axial position of the shaft; a controller coupled to the sensor, in which the controller can determine, based on the first signal, an amount of axial force to apply to the shaft to maintain axial levitation of the shaft; and multiple magnetic thrust bearings coupled to the shaft and the controller, in which each magnetic thrust bearing can modify a load on the shaft to maintain an axial position of the shaft based on a second signal that corresponds to the determined amount of axial force.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

Figure 1:
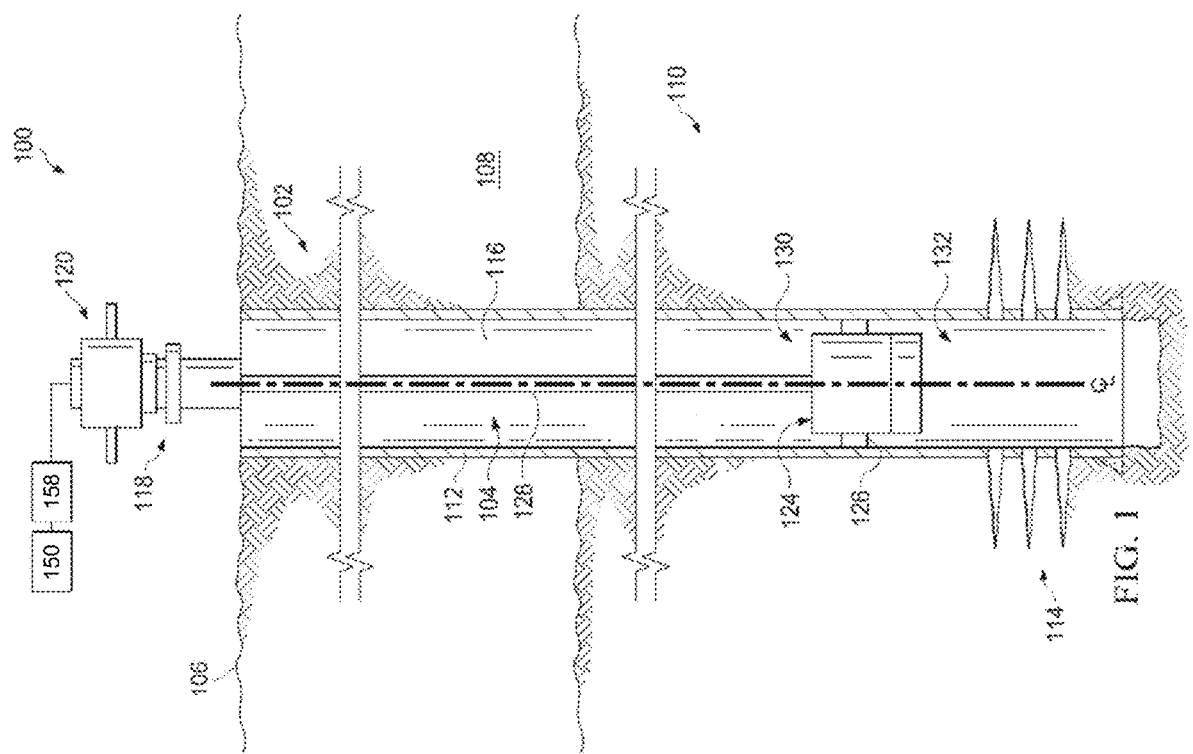
FIG. 1 is a schematic side view of an example well system.

In the downhole environment, it is difficult to install and operate any equipment due to the caustic fluids present, pressures, temperatures, and relative distance from any supporting equipment that cannot be repackaged to fit in a small diameter tube. In addition, any installation and removal of tools in the well requires the well to be "shutdown" or "killed" to prevent fluid flowing to the surface that can cause damage or injury, a very costly process not only in performing the work but also in lost production and risk in damaging the well where further production is jeopardized.

While all these issues and risk exist, the potential benefit of well intervention with production enhancing tools and measurement equipment is a prevalent industry because of the enhanced production it can offer. While these benefits have been demonstrated, reliability and robustness of equipment in this harsh environment is not close to conventional topside mounted equipment. The described technology can improve reliability and robustness of such equipment by utilizing a magnetic bearing system for rotor support (a magnetic thrust bearing for thrust support and a magnetic radial bearing for radial support), a high speed permanent magnet motor for torque, a sensor-less long distance variable frequency drive, magnetic bearing controls, and advanced fluid compression and pump configuration. The use of the radial magnetic bearing system, thrust magnetic bearing system, and permanent magnet electric machine allow for adequate operating clearances between rotating and nonrotating parts for fluid to pass, eliminating the need for seals, barrier fluid systems or protection bag/bellow systems. Particulate material in process fluid is free to flow through the clearances. For example, particulates can be approximately 1-4 millimeters (mm) in size. The clearances also allow for integration of an isolation barrier to allow operation independent of the environment and not requiring any lubricants or cooling that may reduce system efficiency and performance. The use of these systems can also provide operational data for the well currently unavailable, or only available with additional sensor systems. For example, the sensor-less variable frequency drive can provide data on operating temperature and fluid properties through its operating requirements. Or another example is an active thrust bearing can provide data on operating pressure during operation and liquid/gas content in the well. The device consists of only high temperature components to allow survival in high temperature environments present in deep wells. The device can utilize fully isolated rotor and stator parts to protect any materials and components that would be adversely affected by the process fluids. This provides the isolation for allowing the process fluid to flow into and through the motor and bearings.

In rotating equipment, support of a rotating shaft (that is, a rotor) can be accomplished by supporting the rotor in a minimum of five degrees of freedom: two degrees of freedom on each end of the shaft in radial directions, and one degree of freedom in the axial direction (thrust). Each of these degrees of freedom require some level of centering force to maintain a desired operating position of the rotor, and a level of damping can be applied to avoid a critical frequency response of the system. A critical frequency response can cause operational issues and can potentially result in damage to the equipment. Axial loads of rotating equipment (for example, pumps or compressors) can vary based on the type of the device, as well as features of the device, such as pressure balancers that work to equally pressurize equivalent areas on each side of a compressor wheel. Thrust bearings are employed to account for any net forces remaining on the shaft, such that the shaft can be maintained in a desired axial location relative to the device.

Downhole devices typically operate in harsh environments constrained by the casing diameter installed in a drilled well. The process fluids present in the well are typically caustic on materials and can degrade equipment operation over the lifetime of the well. For downhole applications, thrust load compensation can be supported by mechanical bearings, such as fluid film bearings. Fluid film bearings utilize a barrier fluid that floods the bearing area to provide a clean lubricant within the bearing clearances in order to reduce friction between opposing bearing surfaces and to remove any heat that is generated by the moving rotor. Fluid film bearings require a lubrication fluid that must be kept clean for reliable operation. Fluid film bearings, due to their need of a fluid-flooded rotor, can also take energy from the drive system, thereby contributing to the overall system losses. Other types of mechanical bearings require lubrication in order to operate reliably. Lubrication for mechanical bearings can be quickly lost as the process fluids flow through the downhole devices, rendering the mechanical bearings unusable. Conventional approaches, for example, employed on electrical submersible pumps, include creating a chamber of clean oil for the mechanical bearings to operate on. The chamber is kept relatively clean by a labyrinth seal, but over time, process fluids can contaminate the oil, which can result in bearing failure.

In contrast, magnetic bearings can be isolated from the downhole environment or optionally operated exposed to the process liquids within the downhole environment, if the components are compatible. Magnetic bearing systems and solenoids for use as thrust compensation devices can offer advantages in certain applications over conventional mechanical bearings or air bearings. Downhole-type devices can use magnetic bearing systems that do not require lubrication and can operate flooded in the process fluid. For sealed systems (such as a motor for an electrical submersible pump), the downhole device does not need to be flooded in liquid to operate, which can significantly reduce drag losses on the motor and therefore increase pumping efficiency. Magnetic bearings also impose minimal losses. Therefore, the use of magnetic bearing systems in downhole devices can increase the relative torque output for an equivalently sized motor, or reduce size and power requirements for the same shaft torque output. Magnetic bearings (passive or active) do not require lubrication and can operate in a variety of environments in which typical lubricated bearings have difficulty operating (such as vacuum conditions or in the presence of sour gas or contaminated oil). The performance of active magnetic bearings is adjustable using a controller programmed in software (within the load ratings of the actuators of the magnetic bearings). A control loop (maintained, for example, by a controller) operates active magnetic bearings, as the actuators of active magnetic bearings are not passively stable. A controller can also provide damping to maintain stable axial position control. Regarding passive magnetic bearings, axial position deflection of the rotating shaft can result in an increased thrust force from the passive bearing to keep the shaft in an axial position band that is acceptable for operation. Separate dampers, either using sensors with feedback or eddy current based passive dampers, can be employed to provide axial damping. Magnetic bearings and solenoids for thrust compensation do not require lubrication and can operate with relatively large axial clearances (for example, larger than 1 mm), which can allow fluid flow between the rotor and stator clearances as well as allow for particles to pass through the clearances.

FIG. 1 depicts an example well system 100 constructed in accordance with the concepts herein. The well system 100 includes a well 102 having a wellbore 104 that extends from the surface 106 through the Earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth 108 defining a reservoir, but in other instances, the zone 110 can be multiple formations or a portion of a formation. For simplicity's sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadedly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

The well system 100 also includes a downhole-type system 124 residing in the wellbore 104, for example, at a depth that is nearer to subterranean zone 110 than the surface 106. The downhole-type system 124, being of a type configured in size and robust construction for installation within a well 102, can be any type of rotating equipment that can assist production of fluids to the surface 106 and out of the well 102 by creating an additional pressure differential within the well 102. For example, the downhole-type system 124 can be a pump, compressor, blower, or multi-phase fluid flow aid. In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole-type system 124 can be configured to fit in, and (as discussed in more detail below) in certain instances, seal to the inner diameter of one of the specified API casing sizes. Of course, the downhole-type system 124 can be made to fit in and, in certain instances, seal to other sizes of casing or tubing or otherwise seal to the wall of the wellbore 104.

Additionally, as a downhole-type system 124, the construction of its components are configured to withstand the impacts, scraping, and other physical challenges the system 124 will encounter while being passed hundreds of feet/ meters or even multiple miles/kilometers into and out of the wellbore 104. For example, the downhole-type system 124 can be disposed in the wellbore 104 at a depth of up to 20,000 feet (6,096 meters). Beyond just a rugged exterior, this encompasses having certain portions of any electronics being ruggedized to be shock resistant and remain fluid tight during such physical challenges and during operation. Additionally, the downhole-type system 124 is configured to withstand and operate for extended periods of time (e.g., multiple weeks, months or years) at the pressures and temperatures experienced in the wellbore 104, which temperatures can exceed 400° F./205° C. and pressures over 2,000 pounds per square inch, and while submerged in the well fluids (gas, water, or oil as examples). Finally, as a downhole-type system 124, the system 124 can be configured to interface with one or more of the common deployment systems, such as jointed tubing (i.e., lengths of tubing joined end-to-end, threadedly and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (for example, a jointed tubing connector, coiled tubing connector, or wireline connector). In FIG. 1, the system 124 is shown deployed on wireline 128.

A seal system 126 integrated or provided separately with a downhole system, as shown with the downhole-type system 124, divides the well 102 into an uphole zone 130 above the seal system 126 and a downhole zone 132 below the seal system 126. FIG. 1 shows the downhole-type system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the system 124 creates in the well 102. In some instances, the seal system 126 of the downhole-type system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type system 124 from a pressure in the wellbore 104 uphole of the seal system 126 of the downhole-type system 124. Although FIG. 1 includes both the downhole-type system 124, in other instances, additional components, such as a surface compressor, can be used in conjunction with the system 124 to boost pressure in the well 102.

In some implementations, the downhole-type system 124 can be implemented to alter characteristics of a wellbore by a mechanical intervention at the source. Alternatively, or in addition to any of the other implementations described in this specification, the downhole-type system 124 can be implemented as a high flow, low pressure rotary device for gas flow in sub-atmospheric wells. Alternatively, or in addition to any of the other implementations described in this specification, the downhole-type system 124 can be implemented in a direct well-casing deployment for production through the wellbore. Other implementations of the downhole-type system 124 as a pump, compressor, or multiphase combination of these can be utilized in the well bore to effect increased well production.

The downhole-type system 124 locally alters the pressure, temperature, and/or flow rate conditions of the fluid in the wellbore 104 proximate the system 124 (e.g., at the base of the wellbore 104). In certain instances, the alteration performed by the system 124 can optimize or help in optimizing fluid flow through the wellbore 104. As described above, the downhole-type system 124 creates a pressure differential within the well 102, for example, particularly within the wellbore 104 the system 124 resides in. In some instances, a pressure at the base of the wellbore 104 is a low pressure (e.g., sub-atmospheric); so unassisted fluid flow in the wellbore can be slow or stagnant. In these and other instances, the downhole-type system 124 introduced to the wellbore 104 adjacent the perforations 114 can reduce the pressure in the wellbore 104 near the perforations 114 to induce greater fluid flow from the subterranean zone 110, increase a temperature of the fluid entering the system 124 to reduce condensation from limiting production, and increase a pressure in the wellbore 104 uphole of the system 124 to increase fluid flow to the surface 106.

The downhole-type system 124 moves the fluid at a first pressure downhole of the system 124 to a second, higher pressure uphole of the system 124. The system 124 can operate at and maintain a pressure ratio across the system 124 between the second, higher uphole pressure and the first, downhole pressure in the wellbore. The pressure ratio of the second pressure to the first pressure can also vary, for example, based on an operating speed of the system 124.

The downhole-type system 124 can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The system 124 can operate in above atmospheric wellbore pressures, for example, at wellbore pressure between 14.7 psia (101.3 kPa) and 5,000 psia (34,474 kPa).

The downhole system, shown as the downhole-type system 124, includes a magnetic bearing controller 150 and an amplifier 158, which in some implementations are located topside to maximize reliability and serviceability. The amplifier 158 can receive a current command signal from the controller 150. The amplifier 158 can amplify the current command signal to a level in scale to drive current to the actuator of the magnetic bearing system, and the actuator can convert the current to a force that is applied to the rotor. As one example, the amplifier 158 can receive a signal that is in a range of (and including) −10 volts to +10 volts from the controller 150, and the amplifier can amplify the signal and output a current that is in a range of (and including) −25 amps to +25 amps (sent to the actuator). Higher or lower currents can be output from the amplifier 158, depending on the gain of the amplifier 158 and other design aspects of the amplifier 158. The amplifier 158 operates as a switching power supply, creating current at the output by applying voltage at the output of the amplifier 158 for varying durations of time. The voltage can be, for example, 200 VDC (volts in direct current), or higher or lower depending on the design of the amplifier 158 and the power supply providing the voltage signal to the amplifier 158. For example, the amplifier 158 can be designed for 200 VDC but operate at 160 VDC due to the available voltage of a rectified 120 VAC (volts in alternating current) signal phase. The amplifier 158 can switch the DC voltage between on and off at varying lengths at frequencies ranging from 10,000 hertz (Hz) to 30,000 Hz (or faster or slower) depending on the design of the amplifier 158. The downhole-type system 124 also includes a sensor 154 (shown in FIG. 2). A digital signal processor (DSP) based or analog based controller receives the position signals from a sensor (for example, the sensor 154 shown in FIG. 2) within the downhole-type system 124 and uses this for input as part of its position control algorithm. In some implementations, the controller 150 is a DSP dedicated and designed for controlling a magnetic bearing system of a downhole-type system (such as the bearing system of the downhole-type system 124). In some implementations, the controller 150 is a computer (including one or more processors) that can execute instructions stored in memory in order to perform a variety of operations, including controlling a magnetic bearing system of a downhole-type system (such as the bearing system of the downhole-type system 124). The sensor 154 can detect a position (such as a radial or an axial position) of a rotating shaft and send a signal, which corresponds to the detected position of the rotating shaft, to the controller 150, for example, across a wired connection. The sensor 154 is described in more detail later. The position control algorithm output is a current command to the amplifier 158 to drive coils of the active bearings within the downhole-type system 124, thus impacting a force on the rotor (details are explained in greater detail later within the disclosure). This loop typically happens very fast, on the order of 1,000-20,000 times a second depending on the system control requirements.

The sensor 154 is configured to sense an axial position of the shaft 216 and generate a first signal corresponding to the axial position of the shaft 216. For example, the downhole end of the rotor 216*c* can have a flanged end (not shown), and the sensor 154 can sense the gap (that is, the distance) between the sensor 154 and the flanged end of the rotor 216*c* to determine an axial position of the shaft 216. Although shown in FIG. 2 as being located within the electric machine 212 (the driver of the downhole-type system 124), the sensor (or multiple sensors) can be located at other locations along the shaft 216, as long as there is a calibrated set point to compare the axial position of the shaft 216 with a desired position of the shaft 216. In some cases, the sensor 154 is configured to generate and transmit signals at a rate on the order of every 50 microseconds or faster. The controller 150 is coupled to the sensor 154, and the controller 150 is configured to receive the first signal generated by the sensor 154, determine an amount of axial force to apply to the shaft to maintain a target axial position of the shaft, and transmit a second signal corresponding to the determined amount of axial force. The magnetic thrust bearings are coupled to the shaft and to the controller 150, and the magnetic thrust bearings are configured to receive the second signal from the controller 150 and modify an axial load (corresponding to and based on the second signal) on the shaft to maintain an axial position of the shaft. The controller 150 can therefore multiplex several signals; the second signal can be a combination of several signals to drive multiple actuators of the magnetic bearings located downhole.

This control system is also capable of interpreting the voltage signals to estimate temperatures and fluid pressures in the well. For example, the control system can include a component that is sensitive to pressure, such as a diaphragm. The diaphragm can have a reference position and can move (that is, expand or contract) when an internal pressure of the diaphragm is different from an external pressure external to the diaphragm. The diaphragm can expand or contract until the internal pressure within the diaphragm matches the external pressure. The contraction or expansion of the diaphragm can affect a voltage signal to the controller 150. The change in the voltage signal due to the contraction or expansion of the diaphragm can be determined by the controller 150, which can then be used to determine the external pressure (for example, the fluid pressures in the well). In some cases, the control system can include a temperature-sensitive material. The temperature-sensitive material can have a reference state and can move (that is, expand or contract) with the temperature of the environment surrounding the temperature-sensitive material. Similarly, the contraction or expansion of the temperature-sensitive material can affect a voltage signal to the controller 150. The change in the voltage signal due to the contraction or expansion of the temperature-sensitive material can be determined by the controller 150, which can then be used to determine the temperature of the surrounding environment (for example, the temperature of the downhole location within the well).

An analog circuit based controller can also perform these functions. Having this DSP or analog circuit based controller topside allows for easy communication, service, improved up time for the system, as any issues can be resolved immediately via local or remote support. Downhole electronics are also an option either proximate to the device or at a location more thermally suitable. In a downhole implementation, the electronics can be packaged to isolate them from direct contact with the downhole environment. The sensor and magnetic bearing can be lubricant-free. In some cases, the sensor 154 and magnetic bearing actuator are not packaged or sealed from the downhole environment or location. For example, the sensor and magnetic bearing can be submerged in the downhole fluids that are being extracted from the subterranean zone 110, while the controller 150 and amplifier 158 are located topside (that is, at the surface 106) and are not exposed to the downhole fluids. Although shown in FIG. 1 as being located at the surface 106, in some cases, the controller 150 and the amplifier 158 can be packaged downhole with the magnetic bearing actuator and sensor 154. In some cases, the controller 150 (which can be located topside) is located at least 500 meters away from the magnetic thrust bearings (which can be located downhole).

Figure 2:
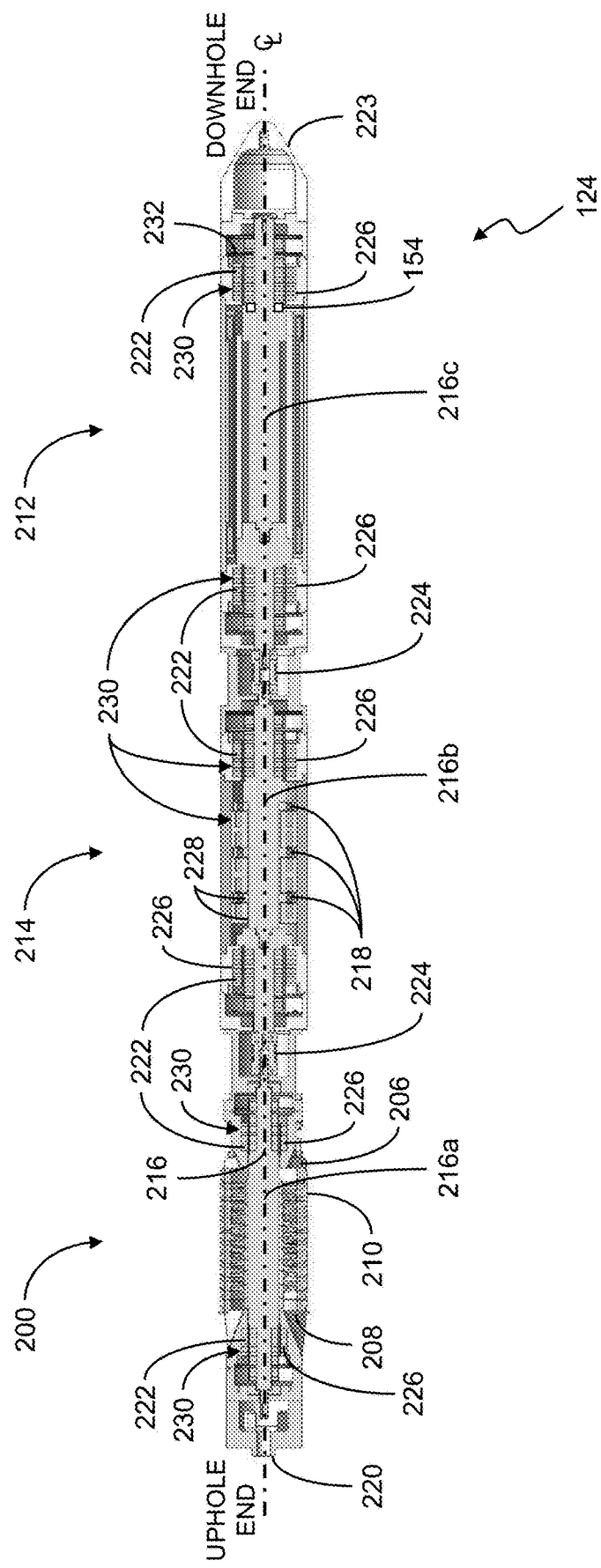
FIG. 2 is a schematic side half cross-sectional view of an example downhole-type system.

The downhole system, shown as the downhole-type system 124 is shown schematically in FIG. 1. FIG. 2 is a half side cross-sectional view of the example downhole-type system 124. Referring to both FIGS. 1 and 2, the example downhole-type system 124 includes a blower 200 and an electric machine 212. As mentioned previously, the downhole-type system 124 can include in addition to or instead of the blower 200, another type of rotating equipment, such as a pump (e.g. an electrical submersible pump). In the context of this disclosure, an uphole end or direction is an end nearer or moving in a direction towards the surface 106. A downhole end or direction is an end nearer of moving in a direction away from the surface 106. A coupling 220 is positioned at an uphole end of the blower 200. The coupling can be of a type used for a wireline connection, a tubing connection, or any other connection configured to support the weight of the downhole-type system. The coupling 220 can include a standard attachment method to attach the blower 200 to a support system. For example, a threaded interface can be used for sucker rod, or a set of bolts can be used to attach two flanges together for production tubing. The blower 200 includes an inlet 206 to receive a gas at the first pressure downhole of the blower 200 and an outlet 208 to output the gas at the second, higher pressure uphole of the blower 200. The inlet 206 can include a filter to limit particle sizes above a certain threshold from entering the downhole-type system 124. A cylindrical outer housing 210 houses an impeller in fluid communication with the inlet 206 to receive the gas from the wellbore 104 at the first pressure downhole of the blower 200 and to drive the gas to the outlet 208 at the second, higher pressure uphole of the blower 200.

The inlet 206 includes a series of holes evenly spaced around the circumference of the housing 210 and oriented in a downhole trajectory. The outlet 208 includes a series of holes evenly spaced around the circumference of the housing 210 and oriented in a uphole trajectory. With the system 124 residing in the wellbore 104, the inlet 206 is at a downhole end of the blower 200 and the outlet 208 is at an uphole end of the blower 200. At a downhole end of the system 124 is a conical tip 223. The conical tip 223 reduces the pressure drop across the system 124. In some implementations, the conical tip 223 can house electronics that can be used in aspects of operation of the system 124 or for sensors. In some instances, the system 124 can be positioned in the well with the downhole inlet 206 positioned adjacent to the perforations 114 in the wellbore 104. For example, the blower 200 can be positioned in the wellbore 104 such that the inlet 206 is disposed next to and immediately uphole of the perforations 114 to maximize or improve the fluid flow from the perforations into the blower 200. In some examples, the inlet 206 may not be adjacent to perforations 114, such as the inlet 206 being positioned greater than about twenty feet away from the perforations 114. In some instances, a speed of the blower 200 is adjusted based on the fluid flow from the subterranean zone into the wellbore 104 (e.g., via perforations 114). For example, as the fluid flow from the subterranean zone into the wellbore 104 decreases, a speed of the blower 200 can increase to draw more fluid flow from the subterranean zone into the wellbore 104.

As previously described, the downhole-type system 124 moves the fluid from the downhole inlet 206 at the first pressure to the uphole outlet 208 at the second, higher pressure. This pressure differential promotes the fluid flow to move uphole of the system 124, for example, at a higher flow rate compared to a flow rate in a wellbore without a blower. The blower 200 can operate at a variety of speeds, for example, where operating at higher speeds increases fluid flow, and operating a lower speeds reduces fluid flow. In some instances, the impeller of the blower 200 can operate at speeds up to 120,000 revolutions per minute (rpm). In some instances, the impeller of the blower 200 can be run at lower speeds (e.g., 40,000 rpm, or other). For the downhole-type system 124 illustrated in FIGS. 1 and 2, the maximum operating speed is 60,000 rpm. Specific operating speeds for the downhole system are defined based on the fluid, pressures and flows for the well parameters and desired performance. Speeds may be as low as 10,000 rpm or as high as 120,000 rpm. While the downhole system has an optimal speed range at which it is most efficient, this does not prevent the downhole system from running at less efficient speeds to achieve a desired flow for a particular well, as well characteristics change over time.

FIG. 2 further illustrates a blower 200, an electric machine 212 and a thrust bearing module 214. The electric machine 212, the thrust bearing module 214, and the blower 200 are all coupled together on a central shaft 216. The electric machine 212 is configured to rotatably drive or be driven to generate electricity by the blower 200. The central shaft 216 is levitated and axially supported by one or more active magnetic thrust bearing assemblies 218 located in the thrust bearing module 214. While one of each electric machine 212, thrust bearing module 214, and blower 200 modules are shown, more than one of each or all are practical in this configuration, thus allowing for additional motor power, additional thrust load support, and additional flow or pressure capacity to be added independently of each other to best produce the specific well performance. In addition, while the order of electric machine 212, thrust bearing module 214, and blower 200 module from downhole to uphole is shown, each module functions independently and can be placed in other orders that best suit the operation and integration of each module. Additional, while a blower 200 is shown, this can be replaced with a compressor, a liquid pump, a multiphase pump, or a combination thereof that best suits the fluids and conditions of the well to maximize well performance. In addition, magnetic thrust bearing assemblies 218 can be seen as one example of such an implementation of magnetic bearings, where magnetic radial bearings can be used in addition, in any case, to enhance the downhole system performance.

The passive magnetic bearing assemblies 222 include permanent magnets on the central shaft 216 and the outer casing 210. The magnets on the central shaft 216 are configured to repel the magnets on the outer casing 210 allowing the shaft to be levitated and supported by the magnets. The passive magnetic bearings do not include any electronic circuitry capable of actively altering the magnetic field to affect the supporting characteristics of the bearings. That is, an external power source is not needed to power the passive magnetic bearings. Both stator magnets and rotor magnets are canned or otherwise isolated to prevent process fluids from reaching the magnets and degrading performance. In some implementations, damping for the passive system, which can be either or both radial or axial, is provided by solid high electrically conductive plates or tubes, such as copper or aluminum.

In some implementations, an active damping circuit 232 can be included with the passive bearing 222. The active damping circuit 232 uses a coil to sense rotor motion and provide a current in size and frequency relative to this motion to a control board. The control board amplifies this signal and adjusts the relative polarity/phase to feed it back to a damping coil that reacts against the rotor field to resist the motion, thus damping out the motion. No position sensors or controller is required for the passive bearing operation. The active damping circuit 232 is able to adjust the magnetic field sufficiently enough to reduce vibration, but does not have the power to significantly affect the lifting or support characteristics of the bearing. In some implementations, the active damping circuit 232 acts as a generator that generates power when the axial gap decreases and thus powers a control coil to increase the levitating force. Thus, it doesn't need a sensor or an outside power source/controller. This approach can also be used for the axial axis, where a sense coil output sensing axial motion is amplified and fed to a damping to coil to react against the rotor field to resist motion.

The active magnetic thrust bearing assembly 218 and the passive magnetic bearing assembly 222 support the central shaft 216 with one or more electromagnetic fields. The central shaft 216 is not physically coupled the outer housing 210 during normal operation; there is no physical connection between the central shaft 216 and the outer housing 210. In other words, the shaft is spaced apart from the housing 210 and any associated mechanism connected to the housing 210 with a radial gap between the central shaft 216 and the housing 210.

In the illustrated implementation (FIG. 2), the electric machine 212 is positioned downhole of the blower 200. The illustrated implementation also shows the active thrust bearing module 214 residing between the electric machine 212 and the blower 200. In some instances, the blower 200, the thrust bearing module 214, and the electric machine 212 can be assembled in a different order. For example, the thrust bearing module 214 can be positioned downhole of the electric machine 212 or uphole of the blower 200.

The central shaft 216 comprises multiple sub-sections coupled together: a blower rotor 216a, a thrust bearing rotor 216b, and an electric rotor 216c. Each sub-section is joined together by a coupling 224. The coupling 224 can be a bellows, quill, diaphragm, or other coupling type that provides axial stiffness and radial compliance. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. As one example, multiple sets of thrust bearings 218 can be included in various devices (such as the blower 200, the bearing module 214, or the electric machine 212), and the multiple sets of bearings can be connected (for example, by quill couplings) to a common shaft (such as the shaft 216) to work together to support a total thrust (axial) load. In some implementations, the central shaft 216 can include a single, unitary shaft that runs through the blower 200, the thrust bearing module 214, and the electric machine 212.

The use of magnetic bearings allows for a seal-less design. That is, the surface of the blower rotor 216a, the thrust bearing rotor 216b, and the electric rotor 216c need not be sealed from and can all be exposed to the production fluid. As no mechanical bearings are used in the downhole-type system, no lubrication is needed. As there is no lubrication or mechanical parts that have contamination concerns, no seals are needed for such components. Sensitive electronic and magnetic components can be "canned" or otherwise isolated from the downhole environment without affecting their electromagnetic characteristics. There is a common fluid path through the passive magnetic radial bearing assemblies 222 and the active magnetic thrust bearing assemblies 218 that allow fluid to flow through an "air-gap" 226 in each of the bearings. More specifically, the active magnetic thrust bearing assemblies 218 have gaps 228 between a bearing housing 230 and the central shaft 216. The gap is unsealed and is of sufficient size to allow fluid flow through the active magnetic thrust bearing assembly 218. The gaps 228 can be annular fluid gaps that are not simply exposed to the process fluid flowing through the downhole-type system 124, but the process fluid is actively flowed through the gaps 228. The passive magnetic radial bearing assemblies 222 include one or more gaps 226 between a bearing housing 230 and the central shaft 216, and such process fluid flow (that is, through the gaps 228) allows for cooling of, for example, the rotor 216 and the bearing assemblies 222.

The radial bearing gaps 226 and the thrust bearing gaps 228 are sufficiently large to allow particulates to pass through without causing damage to rotating or stationary components. For example, in the illustrated implementation, an air-gap between the central shaft 216 (e.g., permanent magnet rotor 216c) and a stator of the electric machine 212 receives the fluid during operation of the downhole-type blower system 124. That is, an air-gap between the permanent magnet rotor 216c and the electric stator of the electric machine receives the fluid during operation of the electric machine. The bearings do not require seals as there is no physical contact between the rotor 216 and the outer case 210. In other words, the central shaft 216 is spaced apart from the outer housing 210 and is not mechanically connected to the outer housing 210. Although the bearings do not require seals, in some implementations, the coils and permanent magnets of the bearings can optionally be isolated in order to protect the magnetic bearings from long term damage by the process fluid.

In some instances, the following method can be used in conjunction with one or more implementations described within this disclosure. A working fluid, such as a production fluid, is flowed through a downhole-type system, such as the downhole-type system 124. The downhole-type system 124 can include a rotor and a stator (such as the rotor 216 and the stator 210). The rotor is supported within the stator, and the stator is spaced from the rotor such that an annular fluid gap is defined in-between. The fluid gap is in fluid communication with an outside environment exterior the downhole-type device, and the working fluid is flowed through the annular fluid gap.

In some implementations, the magnetic bearings can be applied as single actuators installed on the shafts of different devices (for example, one for the blower rotor 216a, one for the thrust bearing rotor 216b, and one for the electric rotor 216c). In some implementations, the magnetic bearings can be packaged on an independent shaft (for example, the thrust bearing rotor 216b), and then coupled to different devices (such as the blower and the electric machine), thereby compensating for the thrust load (from the other devices) through the couplings between the devices and the independent shaft.

Figure 3A:
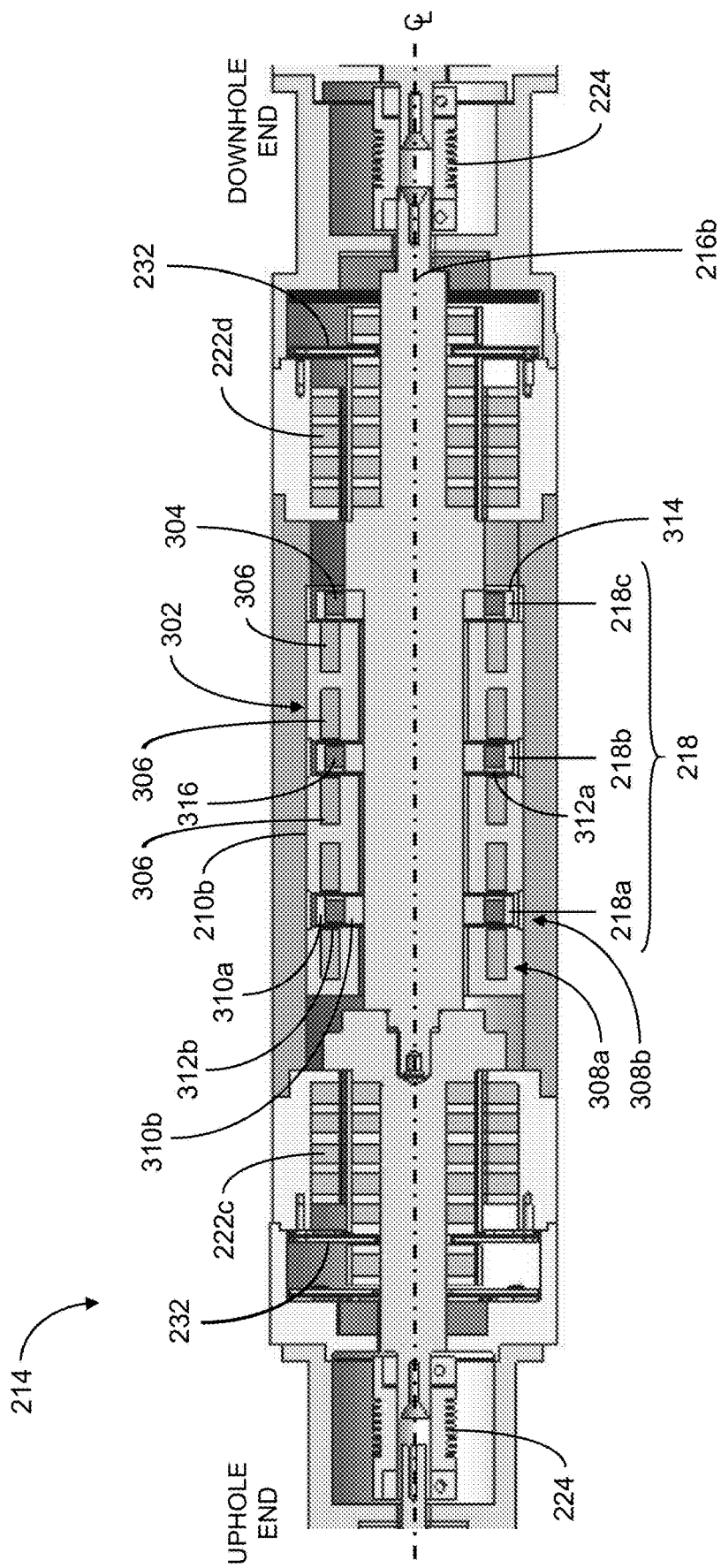
FIG. 3A is a schematic side half cross-sectional view of an example thrust bearing module of the downhole-type system in FIG. 2.

FIG. 3A is a side cross-sectional view of an example thrust bearing module 214. The thrust bearing module 214 includes one or more magnetic thrust bearings 218 to support a central rotor 216 (bearing rotor 216b) to a surrounding stator 210b. The magnetic thrust bearing 218 can be passive or active and is configured to levitate and support a central rotor 216 axially within an outer housing 210 (surrounding stator 210b). In some cases, the magnetic thrust bearings 218 are sealed from the downhole environment (that is, the magnetic thrust bearings 218 are not exposed to the downhole or process fluids). In some cases, only some components—such as any critical components that are necessary for the function of the magnetic bearing in levitating the shaft (for example, the coils or the permanent magnets of the bearings)—of the magnetic thrust bearings 218 are sealed from the downhole environment. On the other hand, the magnetic thrust bearings 218 can be exposed to the process fluids and operated flooded, where the process fluid flows through the magnetic thrust bearings 218 under normal operation. Axial vibrations are mitigated with active magnetic thrust bearings 218, or with an additional axial damping circuit (not shown). Radial magnetic bearing damping circuits 232 can be configured to damp radial vibrations.

In some instances, one or more position sensors (such as the sensor 154) are required for an active magnetic bearing, such as for the thrust bearings 218, and can use conventional inductive, eddy current, or other types of sensors. These sensors can be isolated from the environment to ensure operation over the time downhole. In some cases, the sensor is located downhole in close proximity to the thrust bearings. For example, the sensor is located downhole within 20 feet from the thrust bearings. In some cases, the sensor is located downhole, but not in close proximity to the thrust bearings (that is, the sensor is more than 20 feet away from the thrust bearings). With conventional sensors, electronics could be installed downhole in the device or at a topside facility with sensor downhole. In other words, the sensor can be located in a downhole location, while the electronics of the sensor are located topside. The position sensors can include a position sensitive generator, such as an axial gap generator, that can produce a voltage proportional to the axial gap that can be used to determine axial position. This offers a high voltage output that can be transmitted over long distances to minimize line drop and noise issues. Multiple approaches can be used to achieve a sensor downhole for the thrust bearing system, but all are unique in how they are integrated into the system to meet the operating environment.

The thrust bearing module 214 compensates for any axial loads and hold the axial position of the multiple module rotors by applying force to the rotor to maintain position. The axial loads can be transmitted on the shaft 216 using couplings. In some cases, the magnetic bearings 218 are located in an isolated environment (for example, canned), and at least a portion of the axial loads are transmitted on the shaft 216 to other devices of the downhole-type system 124 using magnetic couplings (such as the couplings 224). As loads are developed from the act of compressing or pumping fluids, the thrust bearing controller 150 senses position movement of the rotor from a target set point. The controller 150 then increases the current (by the amplifier 158) to the magnetic thrust bearing 218 that is converted to force on the rotor. This force is determined based on the amount of displacement sensed and the rate of change in motion using the specific control approach set by the controller 150. The thrust bearing 218 with sensor 154, controller 150, and amplifier 158 is thus able to compensate for forces on the rotor and apply corresponding off-setting forces to keep the rotor in an axial centered position. While a permanent magnet on the rotor configuration is shown, various configuration of thrust bearing could be applied, including all electric or alternative permanent magnet configurations.

As illustrated, the thrust bearing module 214 allows for non-magnetic spacers 314 to be used at the rotor outer diameter for setting stator axial position and for locking the split stator assemblies 302. Opposite polarity permanent magnets 304 are used on the rotor 216b to allow for coil wrapping of one or more back-to-back stator cores 306 to reduce overall bearing size and make assembly possible in split stator halves (i.e. both use the same coil). The outer housing, limited by the well installation casing size and flow path requirements, limits thrust bearing outer diameter, where the rotor outer diameter is further limited by the stator spacer and adequate clearance for rotor radial motion during operation and transport, and radial rotor growth due to high speed operation. In the illustrated implementation, the stator poles 308a are radially offset from the rotor poles 310b. With the restricted rotor outer diameter limiting the rotor pole size, the stator pole offset increases the cross section of the stator poles 308a, which increases the capacity of the thrust bearing 318, increasing bearing capacity without increasing overall bearing size.

Figure 3B:
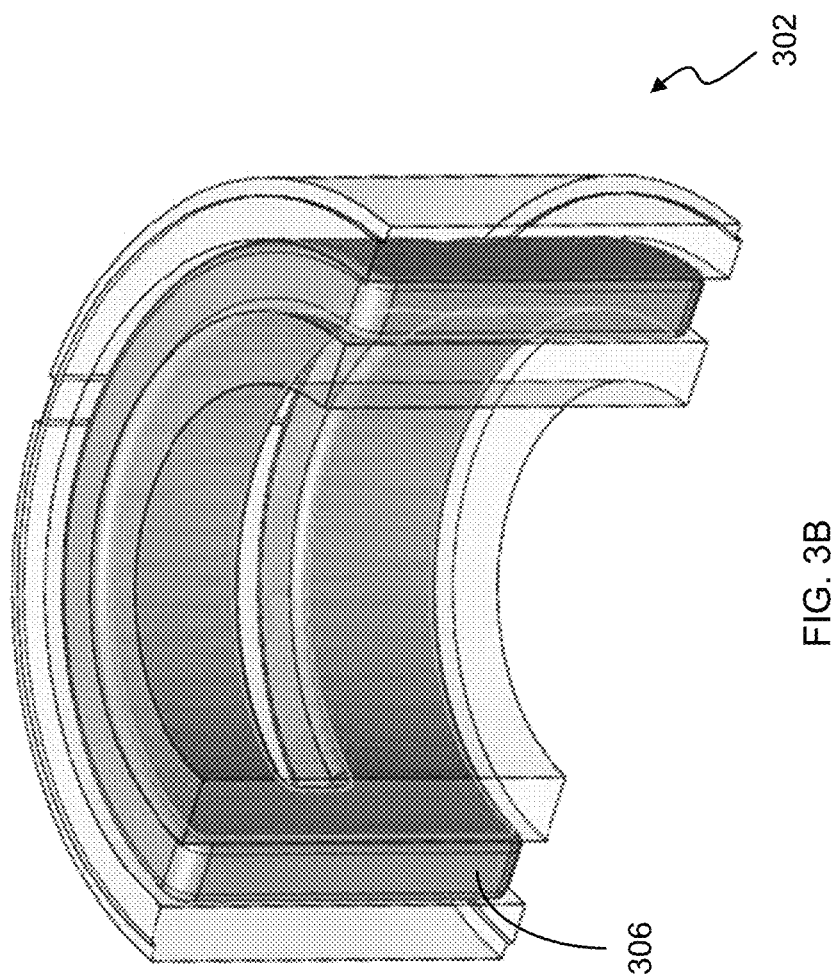
FIG. 3B is a perspective cut-away view of an example half stator pole.

Illustrated in FIG. 3B is an example "C" shaped core 306 (arcuate portion) used in the stator 302. The polarity for these cores 306 as it applies to each opposite pole face is opposite of one another. The arcuate portions 306 can include a first, semi-circular arcuate portion and a second, semi-circular arcuate portion. For example, each back to back core 306 is split in half to form two 180-degree assemblies. The magnetic thrust bearings can include respective actuators coupled by an electrical winding (also referred as a coil). The coil is configured to pass an electric signal in response to which the actuators generate respective magnetic fields. The coils in each of these 180-degree (semi-circular) assemblies are wrapped from one side to the other, and results in opposite coil polarity on each side of the core 306. This in conjunction with the permanent magnets 304 on the rotor 216b having opposite polarity works to minimize size and simplify integration (coils that are split do not need to be routed to the outer diameter where they take up additional room and do not aid in generating bearing force). In some cases, each magnetic thrust bearing includes an actuator, each actuator is coupled to its respective magnetic thrust bearing by a coil, and the coils are connected together.

The illustrated implementation (FIG. 3A) shows a three bearing module with a first thrust bearing 218a, a second thrust bearing 218b, and a third thrust bearing 218c. Lift can be imparted on the rotor with coil current in one direction, and lift can be reduced with coil current in the opposite direction. The number of thrust bearings in a module can be one or more, depending on size, integration, rotodynamics, load requirements, and other design considerations.

The bearing module 214 includes a rotor outer pole 310a. The rotor outer pole 310a is a magnetic steel pole that is magnetically acted upon by the stator pole 308a to produce force on the rotor 216b. The rotor outer pole 310a acts to conduct a permanent magnet field and a coil generated magnetic field and acts as the primary containment of the permanent magnet 316 onto the rotor for high speed operation. In some implementations the rotor outer pole 310a is secured with an interference fit on an inner diameter of the rotor outer pole 310a to the permanent magnet ring 316.

A rotor inner pole 310b is a magnetic steel pole that is magnetically acted upon by the stator pole 308a to produce force on the rotor 216b. The rotor inner pole 310b acts to conduct the permanent magnet field and the coil generated magnetic field. The rotor inner pole 310b is the primary connection point to the shaft 216 (rotor 216b) with which the thrust bearing forces are applied to the shaft 216.

A radially magnetized permanent magnet ring 316 is a permanent magnet material that provides magnetic field that the thrust bearing 218 uses to distribute to stator poles 308a on each side of the rotor 216b, thus energizing each gap between rotor pole and stator pole. The permanent magnet field provides roughly half of the maximum field designed for the stator poles 308a and rotor poles 308b, where this level allows for linear current load response from the bearing. The permanent magnet ring 304 is radially magnetized to provide a uniform polarity field to the outer poles and inner poles. With the use of multiple thrust bearings 218, the polarity of these rotor permanent magnets 304 changes from one to the next to allow for opposite coil polarity in double stator poles.

A rotor seal can 312a is a ring that covers the permanent magnet 304 sides and is welded or otherwise sealed to the metal outer and inner poles to prevent process fluids from contacting the permanent magnet and degrading performance. The cans 312a can be metallic, and nonmagnetic, but could also be made of a non-metallic material, such as Peek or ceramic.

A thrust bearing stator pole 308a is a stator pole that includes a magnetic steel material that conducts the permanent magnet flux and electromagnet coil flux for energizing the pole air gaps that result in forces on the rotor 216b. The thrust bearing stator poles 308a are secured to the housing to transmit forces relative to the outer housing 210.

A thrust bearing coil (also referred as a solenoid) is an electromagnet coil that is a wound coil with electronic insulation to take currents from the magnetic bearing controller and convert these to magnetic field in the thrust bearing 218. In some implementations, the thrust bearing coil can be made of copper.

A thrust bearing stator seal can 312b is a ring that covers the electromagnet coil sides and is welded or otherwise sealed to the metal outer and inner poles to prevent process fluids from contacting the electromagnet coil and affecting performance. The cans 312b can be metallic, and nonmagnetic, but could also be made of a non-metallic material, such as Peek or ceramic.

A stator pole spacer 314 is a spacer that includes non-magnetic steel pieces and is used to set the relative position of two stators or a stator and housing to locate the stator poles in relation to the housing 210. A double stator pole is split in two halves for assembly (a single half is shown in detail in FIG. 3B). These stator poles include two halves that use two coils. The coils wrap 180 degrees on one side and then are routed to the other side where they wrap 180 degrees back and route back to where they started to form a complete loop. This coil winding, along with polarizing the rotor magnets opposite for each subsequent rotor, allows for utilizing the complete coil loop for a split stator pole. As such the two poles are combined for minimum space necessary.

Figure 4:
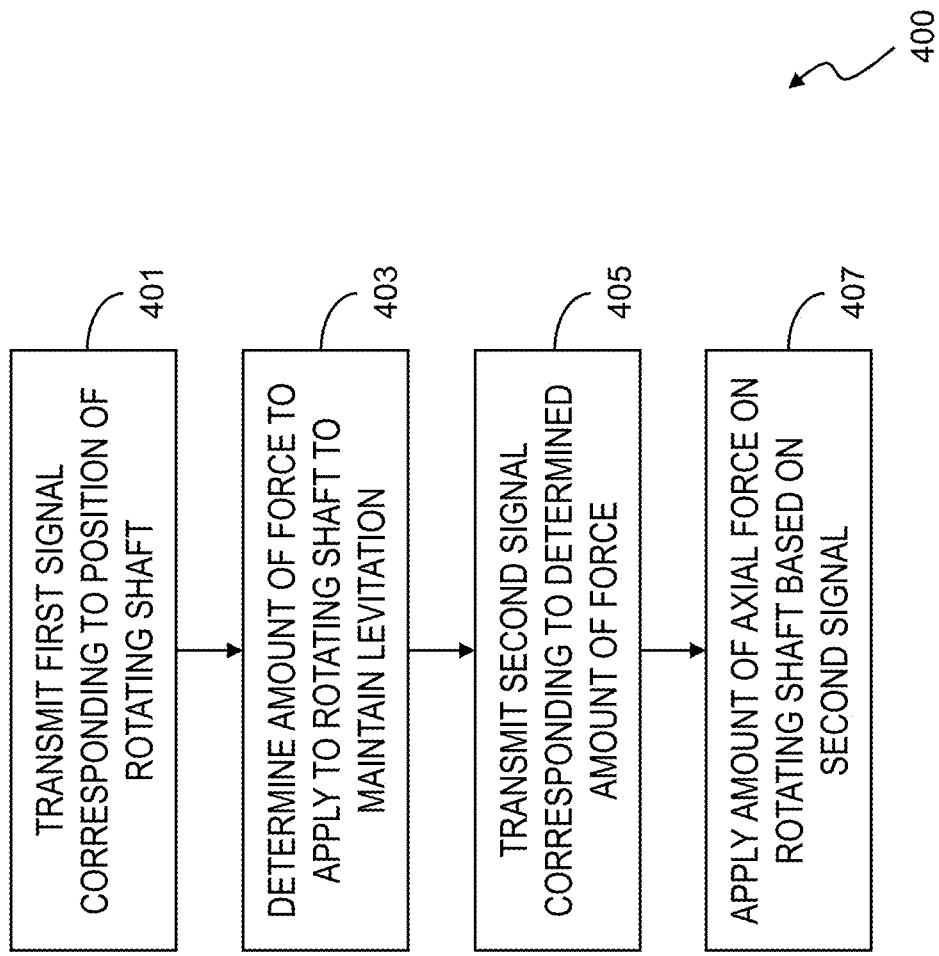
FIG. 4 is a flow chart of an example method for supporting a shaft of a downhole-type system.

The components described previously within this disclosure can be used to implement the following example method 400 shown in FIG. 4, for supporting axial loads of a rotating shaft (rotor). A shaft of a downhole-type wellbore system is axially levitated by multiple magnetic thrust bearings. The magnetic thrust bearings are lubricant-free. In some cases, the magnetic thrust bearings are sealed from the downhole environment. The method 400 is carried our while the shaft is rotating in a downhole location. At 401, a first signal corresponding to an axial position of the rotating shaft (such as the rotor 216) is transmitted by a sensor (such as the sensor 154). The sensor can detect an axial position of the rotating shaft and transmit the first signal to a controller (such as the controller 150 located at the surface 106) across a connection, such as the wireline 128.

At 403, an amount of axial force to apply to the rotating shaft to maintain a target axial position of the rotating shaft is determined by a controller based on the first signal. For example, the position of the rotating shaft is compared to a desired position, and an amount of force required to return the rotating shaft to the desired position (to maintain desired levitation of the shaft within the downhole-type system) is determined by the controller 150. As one example, a magnetic bearing can have a force constant of 100 pounds per amp of applied current. The controller 150 (for example, based on a programmed response to a sensor signal of 0.005 inches of rotor position deviation from the target position) can provide a signal to the amplifier 158, which amplifies the signal and provides 0.5 amps to the actuator of the magnetic bearing in order to apply 50 pounds of force to the shaft (rotor).

Adding a non-time varying force to the rotor is a simple example of responding to a static deflection in position. For example, the controller 150 can be programmed to ramp up the current quickly when a measured position is far from the target position, but as the measured position approaches the target position, the controller 150 can ramp slowly, so that the position of the shaft does not overshoot the target position. As the frequency or rate of change in position occurs, such as synchronous position movements due to an unbalance of the shaft as it rotates, the response of the controller 150 may be more complicated to effect stable rotor position control. As one example, the control approach can be a proportional-integral-derivative (PID) control, which is a method of determining the proportional, integral, and derivative responses based on sensor input and summing the responses (proportional, integral, and derivative) to determine a control output. The proportional component is dependent on error, that is, the difference between a setpoint and a measured value (such as the target position and the measured position, respectively). The integral component sums the error over time, allowing the response to increase over time to achieve a desired response (for example, returning to the target position). The derivative component is dependent on the rate of change of the sensor signal.

Continuing the earlier example, the proportional response first determines that the response to the displacement should be 0.5 amps. If the position does not change based on the next measured position signal received, the integral component increases the current response for the same (unchanged) displacement (and accordingly, the proportional response stays the same). On the next cycle (that is, receiving the next measured position signal), if the rotor position has changed significantly and is now 0.001 inches away from the target position (in which the proportional component would then correspond to a current of 0.1 amps), the derivative component only allows a current of 0.01 amps, due to the quick change in rotor position. The magnetic bearing system (together with the controller 150) can operate continually to maintain the rotor position at the target position. The closeness of the rotor position to the target position can be affected by the level of control required by the system, the level of noise in the signals, and the forces acting on the rotor. Position control within 0.00001 inches are typical for high-precision magnetic bearing systems, but control within 0.005 inches or more can be acceptable for other applications.

At 405, a second signal corresponding to the determined amount of axial force is transmitted to the magnetic thrust bearings (such as the bearings 218) by the controller. The magnetic thrust bearings and the controller can be coupled by a connection (for example, the wireline 128), and the second signal can be transmitted through the connection. The magnetic thrust bearings can be coupled to the controller in a parallel configuration, a series configuration, or combinations of both.

At 407, the amount of axial force on the rotating shaft to maintain the target axial position of the rotating shaft is applied by the magnetic thrust bearings based on the second signal. A magnetic thrust bearing can include an actuator and a target. The axial force on the rotating shaft can be applied or adjusted by generating (by the actuator) a magnetic field in response to receiving an electric current (for example, from the controller) and generating (by the target) an axial force in response to the magnetic field generated by the actuator. The actuator can include multiple arcuate portions (such as the "C" shaped cores described previously) which define respective openings that complement each other to define an annulus that is larger than an outer diameter of the rotatable shaft. The annulus is the clearance between the rotor and the stator, which can be larger than 1 mm, as described previously. The arcuate portions can include a first semi-circular arcuate portion and a second semi-circular arcuate portion (for example, two "C" shaped cores). The magnetic thrust bearings can include respective actuators that are coupled by an electric winding (that is, coil) configured to pass an electric signal in response to which the actuators generate respective magnetic fields (that is, each actuator generates a respective magnetic field, and respective targets can generate respective axial forces on the rotating shaft based on the respective magnetic fields).

In some implementations, a downhole-type system includes a rotatable shaft supported by multiple magnetic thrust bearings coupled to the shaft, a sensor, and a controller coupled to the sensor. The sensor is configured to transmit a first signal that corresponds to an axial position of the shaft, and the controller is configured to determine (based on the first signal) an amount of axial force to apply to the shaft to maintain a target axial position of the shaft. The magnetic thrust bearings are also coupled to the controller and are configured to modify a load on the shaft in order to maintain an axial (or rotational) position of the shaft based on a second signal (transmitted by the controller) corresponding to the determined amount of axial force. The downhole-type system can include radial bearings to further support the shaft and maintain a radial position of the shaft.

In some implementations, the actuators include respective fuses, which can each electrically fail in response to an increase in the electric signal beyond an electric signal threshold through a portion of the winding wound around each respective actuator. The increase in electric signal can be a result of a short in the actuator winding. For example, a thrust coil can be rated for a maximum current of 5 amps. During a short, the current may increase two to ten times the maximum rating (or more), depending on the power source for the coils. Continuing the example, the fuse can be rated for 8 amps to allow for conditions where current rises for short peak loads, but the fuse isolates the coil during significantly high currents that might be, for example, a result of coil short circuits to ground. In parallel configurations, when one actuator fails, the remaining actuators can cooperate to support the axial load on the rotating shaft for continued, uninterrupted operation. In some cases, the fuses can be reset from a remote location (for example, from a topside location that is more than 500 meters away).

A shaft is centrally positioned within a stator comprising an electric machine with a radial magnetic bearing assemblies coupled to the shaft and the stator. The shaft is axially supported with a magnetic thrust bearing assembly coupling the shaft and the stator. The shaft is rotated within the stator positioned within a wellbore.

While some examples of the subject matter have been disclosed, aspects of this disclosure can describe other implementations. For example, in some implementations, the central shaft rotates at a sub-critical speed below a first harmonic of the central shaft. In some implementations, the central shaft can include a single, continuous shaft. While the illustrated examples included at least two radial bearings within each module, a single radial bearing at an uphole end of the downhole-type system and at a downhole end of the downhole-type system (two total radial bearings) can provide adequate levitation and support. Active and/or passive damping systems can be used on the magnetic radial bearings, the magnetic thrust bearings, or both. In instances where a passive damping system is used, a highly electrically conductive metal plate, such as a copper plate, can be used. In such an instance, the movement of the rotor generates eddy currents on a copper plate. The eddy currents in turn generate a magnetic field that opposed the field in the rotor, resulting in a force applied to the rotor opposite that of the motion, reducing the motion. The faster and larger the motion, the larger the force generated on the plate in response to the motion. While a permanent magnet rotor was described in the context of the electric machine, an inductive rotor, can be used to similar effect.

The techniques described here can be implemented to yield a construction that is simple, inexpensive, and physically robust. The system can be deployed without special hydraulic or electrical requirements and can be easily retrievable with minimum or no risk of being stuck in the wellbore. The concepts described herein with respect to a blower could also be applied to a compressor, having a higher pressure ratio and lower throughput, a pump, or a multiphase system where the fluid is a combination of liquid and gas. While this disclosure has been described in the context of production applications, it can also be used in injection applications. For example, the described systems can be used to inject fluid into a reservoir to maintain a production pressure on the reservoir.

A number of implementations have been described. Nevertheless, it will be understood that various modifications may be made. Accordingly, other implementations are within the scope of the following claims.

What is claimed is:

1. A method comprising:
during rotation of a shaft of a downhole-type wellbore system, the shaft axially levitated by a plurality of magnetic thrust bearings,
transmitting, by a sensor, a first signal corresponding to an axial position of the rotating shaft;
determining, by a controller, an amount of axial force to apply to the rotating shaft to maintain axial levitation of the rotating shaft based on the first signal;
transmitting, by the controller, a second signal that corresponds to the determined amount of axial force to the plurality of magnetic thrust bearings; and
applying, by the plurality of magnetic thrust bearings, the amount of axial force on the rotating shaft to maintain the axial levitation of the rotating shaft based on the second signal.

2. The method of claim 1, wherein the plurality of magnetic thrust bearings is sealed from a downhole environment.

3. The method of claim 1, wherein the plurality of magnetic thrust bearings is lubricant-free.

4. The method of claim 1, wherein the plurality of magnetic thrust bearings is coupled to the controller in parallel, in series, or combinations thereof.

5. The method of claim 1, further comprising:
generating, by an actuator of one of the plurality of magnetic thrust bearings, a magnetic field in response to receiving an electric current; and
generating, by a target of one of the plurality of magnetic thrust bearings, an axial force in response to the generated magnetic field.

6. The method of claim 5, wherein the actuator comprises a plurality of arcuate portions defining a respective plurality of openings that complement each other to define an annulus larger than an outer diameter of the rotatable shaft.

7. The method of claim 6, wherein the plurality of arcuate portions comprises a first, semi-circular arcuate portion and a second, semi-circular arcuate portion.

8. The method of claim 6, wherein the plurality of magnetic thrust bearings comprises a respective plurality of actuators configured to generate a respective plurality of magnetic fields, and the actuator is one of the respective plurality of actuators.

9. The method of claim 8, further comprising electrically failing in response to an increase in the electric signal beyond an electric signal threshold.

\* \* \* \* \*